United States Patent Office 3,654,340
Patented Apr. 4, 1972

3,654,340
CYANOACRYLATE MONOMER PROCESS
Elden H. Banitt, Woodbury, Minn., assignor to Minnesota Mining and Manufacturing Company, St. Paul, Minn.
No Drawing. Continuation-in-part of application Ser. No. 641,142, May 25, 1967, which is a continuation-in-part of application Ser. No. 595,324, Nov. 18, 1966. This application Aug. 27, 1970, Ser. No. 67,635
Int. Cl. C07c 121/48, 121/30, 121/52
U.S. Cl. 260—465.4
6 Claims

ABSTRACT OF THE DISCLOSURE

A new step in the condensation of formaldehyde and esters of 2-cyanoacetic acid to produce 2-cyanoacrylate esters which consists essentially of catalyzing the reaction by means of a mixture of an acid and the salt of a primary or secondary amine with the same or stronger acid. To be effective, the catalytic mixture should have a pH value of 5 or less when exact amounts of its components are dissolved in 25 ml. of water. If the catalytic mixture is to include an acid which is not readily soluble in water (e.g. organic acids), then the pH is measured in 25 ml. of an ethanol-water mixture and subsequently corrected as described in J. Am. Chem. Soc., 75, 576 (1953).

This application is a continuation-in-part of my earlier-filed application Ser. No. 641,142 filed May 25, 1967 which was a continuation-in-part of my earlier application Ser. No. 595,324, filed Nov. 18, 1966, now abandoned.

FIELD OF INVENTION

This invention relates to a process for the preparation of 2-cyanoacrylate monomers and is particularly concerned with such preparation in improved yields. The invention includes a new step in the condensation of 2-cyanoacetic esters to produce 2-cyanoacrylate esters and consists essentially of catalyzing the reaction by means of a mixture of an acid and the acidic salt of an alkyl primary or secondary amine with an acid of the same or greater strength.

DESCRIPTION OF THE PRIOR ART

Monomeric 2-cyanoacrylates previously have been prepared by means of base-catalyzed condensation of esters of cyanoacetic acids and formaldehyde, during which condensation water is azeotropically removed and low molecular weight polymeric cyanoacrylate esters are isolated and thermally depolymerized to give the monomer. This process was originally described in Ardis, U.S. Pat. No. 2,467,927, and substantially improved upon by processes disclosed in Joyner and Hawkins, U.S. Pat. No. 2,721,858; Joyner and Shearer, U.S. Pat. No. 2,756,251 and Jeremias, U.S. Pat. No. 2,763,677. Since, however, the polymerization of 2-cyanoacrylate monomer as disclosed in the above references requires initiation by weak bases, trace amounts of base which remain from the condensation step may be carried over into the product and cause unpredictable re-polymerization of monomer. Thus, it has been observed that yields of monomeric 2-cyano-acrylate prepared using these processes have evidenced a marked lack of uniformity, some batches existing as monomer (having useful shelf life) for shorter or longer periods of time than others.

It is the object of this invention, therefore, to improve upon these processes so as to provide a reliable and reproducible method for preparing monomeric 2-cyanoacrylates in pure form and in certain cases, to increase the overall yield of monomer.

This object is attained by employing a novel and significant step in the process for preparing 2-cyanoacrylate monomers which has not heretofore been utilized in the art. This step embodies the use of an acidic catalytic mixture consisting of an acid and a primary or secondary aromatic or heterocyclic amine salt with the same or stronger acid, both of which components must be present throughout the condensation reaction as is evident from the examples hereinafter. Without the presence of said amine acid salt throughout the course of the reaction, esters of cyanoacetic acids normally will not undergo acid-catalyzed condensation with formaldehyde.

So far as is known, acid catalysis has not heretofore been utilized in preparing polymers of 2-cyanoacrylates. See, e.g. U.S. Pats. 2,467,927; 2,721,858, 2,756,251 and 2,763,677, in each of which basic catalysis is referred to for forming the polymer and no disclosure is made of acid catalysis for that purpose.

Thus, the present invention provides a process which, by employing an acidic catalytic mixture for both initial polymer formation and subsequent depolymerization, differs substantially in concept from prior art methods. It has been found that the preparation of 2-cyanoacrylate monomers by the process of this invention results in yields of substantially increased purity, stability and uniformity, and specifically in the case of fluoroalkyl monomers, improved yields. The difficulty with spontaneous, premature polymerization of monomer after acid depolymerization encountered with the process of the prior art is substantially reduced using this process.

SUMMARY OF THE INVENTION

The process of this invention is especially useful in the preparation of monomeric fluoroalkyl 2-cyanoacrylates. Yields of monomeric fluoroalkyl 2-cyanoacrylates prepared from the corresponding acetates are in the range of 40 to 50 percent, which generally is up to double the yield available by means of base catalyzed processes of the prior art type. The purity of the fluoroalkyl monomers obtained in the depolymerization step is shown by vapor phase chromatography to be usually 95 percent or greater.

This invention may be practiced by employing esters of 2-cyanoacetic acid of the formula

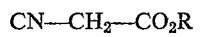

$$CN-CH_2-CO_2R$$

wherein R is a member of the group of allyl, cyclohexyl, phenyl, benzyl, or $CHR_1R_2$ containing 1 to 8 carbon atoms wherein $R_1$ or $R_2$ is independently H, alkyl or perfluorakyl or monohydroperfluoroalkyl of 1 to 7 carbon atoms, chloro-or alkyl of 1 to 4 carbon atoms and 1 to 3 chlorine or fluorine atoms, unsubstituted or halogenated oxa- or thia-alkylene of 3 to 7 carbon atoms containing not more than two chlorine or three fluorine atoms. Included in such compounds are methyl, ethyl, n-octyl, isopropyl, isobutyl, n-butyl, neopentyl, methoxyethyl, ethoxyethyl, isopropoxyethyl, n-butoxyethyl, phenyl, benzyl, cychlohexyl, 3,3,3 - trifluoroisobutyl, 1,1 - dichloroisopropyl, 1,1,1-trifluoroisopropyl, 2-(2,2,2-trifluoroethoxy)ethyl or 1-(2,2,2-trifluoroethoxy)isopropyl, 2-allyloxyethyl, 2,2,2-trifluorothioethyl, ethylthioethyl, 1,1,7-trihydroperfluoro heptyl, 1,1-dihydroperfluoropentyl, 3-(trifluoromethyl)butyl, n-hexylthioethyl, methylthioethyl, 2-chloroethyl omega-hydroperfluoro-n-amyl cyanoacetates each of which is found to react with formaldehyde in the process of the invention to provide the corresponding cyanoacrylate.

With particular reference to the preparation of fluoro-alkyl 2-cyanoacrylate esters, it is preferred to employ 2(2,2,2-trifluoroethoxy) ethyl 2-cyanoacetate, 2,2,2-trifluoroethyl 2-cyanoacetate, 1,1-dihydroper-fluoropropyl 2-cyanoacetate or 2,2,3,3-tetrafluoropropyl 2-cyanoacetate. The ester is reacted with anhydrous formaldehyde or polymers thereof such as paraformaldehyde. Aqueous solutions of formaldehyde as typified by formalin are unsatisfactory. The reaction medium may be any suitable inert organic solvent capable of forming an azeotrope with water or codistilling with water such as benzene, toluene, xylene, etc. The reaction is carried out under approximately atmospheric pressure at the boiling point or codistillation temperature of the azeotrope or solvent, i.e., about 60°–160° C., and preferably 70° to 145° C. Other similar solvents capable of removing water may be used under other pressures at the same temperature range.

The essential and novel feature of this invention is the particular combination of catalytic materials employed. Because esters of cyanoacetic acids normally will not undergo simple acid- catalyzed condensation with formaldehyde, the amine acid salt plays an integral role; without it the reaction fails. Any acid salt of an aliphatic or cycloaliphatic primary or secondary or aromatic or heterocyclic amine and any free acid may be utilized as components of the catalytic mixture, provided they establish the necessary pH value is described in detail below. The salt forming acid may be of the same strength as the free acid or stronger. Thus one or two acids may be used or more. Two different salts may be present simultaneously.

DESCRIPTION OF THE PREFERRED EMBODIMENTS

The improved results obtained in accordance with this invention depend essentially upon carrying out all phases of the synthetic sequence under acidic conditions. A criterion for utility of the catalytic mixture selected is that it have a corrected pH value of not over pH 5. This pH value can be determined as follows:

The exact amounts of amine acid salt and free acid to be used in the condensation step are dissolved in 25 ml. of water, and the pH of the solution is measured. If the resulting pH value is 5 or less, the mixture will adequately catalyze the condensation reaction. When the mixture is soluble in water, this is the "corrected pH value."

Catalytic mixtures comprising organic acids which are not readily soluble in water may be dissolved in 25 ml. of an ethanol-water mixture; however, the measured pH must then be corrected as described by B. Gutbezahl and E. Grunwald in J. Am. Chem. Soc., 75, 565 (1953).

A convenient method for determining such mixtures is to dissolve 1 gram of amine salt in 50 ml. of water (or water-ethanol mixture) together with the proportional amount of the acid to be used. If the pH of the solution (corrected for water-ethanol mixtures as described in the reference) is 5 or less, this combination and proportion is suitable. If the pH is not sufficiently low more acid is added until the suitable proportion is determined. The solution tested for pH is seen to be about 2–5% by weight of the catalyst combination.

Particularly preferred catalyst combinations include:

piperidine hydrochloride and glacial acetic acid;
piperidine hydrochloride and hydrochloric acid;
bis-(2-chloroethyl) amine hydrochloride and acetic acid;
morpholine hydrochloride and acetic acid.

Proportions are such that from about 4 to 25% of the mixture is acid and preferably about 4–10%.

Other combinations of acid catalysts are made up from acids of suitable strength, i.e., a dissociation constant of $1 \times 10^{-5}$ or more (smaller exponent), and a primary or secondary aliphatic or cycloaliphatic or secondary aromatic or heterocyclic amine having a pKa of at least 4 and preferably 10 or more. Preferred amines are secondary amines of the group of alkyl and heterocyclic with pKa of above 10. Tables of constants for bases and acids are available, e.g., Handbook of Chemicals and Physics. Exemplary suitable acids include sulfuric, perchloric, phosphoric, hydrochloric, acetic, mono-, di- or tri-chloro- or -fluoro-acetic, bromoacetic, propionic, α- or β-bromopropionic, butyric, phthalic, trifluoromethanesulfonic and toluenesulfonic acids to name a few. It is preferred that the acids are not strongly oxidizing and they should not be substituted with hydroxyl, amino or other groups than the acid group which provide Zerewitinoff-type hydrogen. It is, of course, convenient and fully satisfactory to use readily available acids although many others are also effective and are equivalents. As noted above, the acid combined with the amine must be of the same or greater strength than the free acid. Interchange of acids will take place spontaneously if a stronger acid such as hydrochloric is used with an amine salt such as the acetate. The extent of the interchange will depend on the relative amounts available. Especially useful amines include pyrrolidine, diethylamine, di-n-butylamine, N-methylpiperazine, morpholine, piperidine, bis(betachloroethyl) amine, of the group having pKa values of 4 and higher and mostly above 10.

It is essential that both primary or secondary amine salt and free acid are always present. Glacial acetic acid or strong mineral acids such as hydrochloric acid or sulfuric acid are preferred. The amount of catalyst employed is not critical and may be varied. Ordinarily small amounts, e.g. 0.5 to 1 percent by weight based on the weight of cyanoacetic ester is adequate.

The process step which is the subject of this invention is the condensation of cyanoacetic esters with formaldehyde using the amine acid salt and free acid as catalysts. The subsequent deploymerization step is carried out by methods similar to prior art methods.

The monomeric 2-cycloacrylates prepared in accordance with this invention are excellent adhesive compositions for bonding almost any type of material to itself or to a dissimilar material. The adhesive monomers are readily employed by merely spreading them in a thin film on the surface to be bonded. Polymerization occurs rapidly without the use of either heat or a polymerization catalyst; the resulting bonds are of very high strength.

This invention is illustrated by the following examples of certain preferred embodiments thereof. It will be understood, however, that the examples are included merely for the purpose of illustration and are not intended to limit the scope of the invention, unless otherwise specifically indicated. All parts are by weight unless otherwise specified, and the pressures are shown in millimeters of mercury.

Example 1: Fluoroalkyl cyanoacetates

Fluoroalkyl cyanoacetates required as starting materials in the synthesis of fluoroalkyl 2-cyanoacrylates described in this invention are not available by simple esterification of cyanoacetic acid. A general procedure for the special preparation of these materials from cyanoacetyl chloride on a large scale is given below.

A 5–1 three-necked, round-bottomed flask equipped with an efficient mechanical stirrer, large addition funnel and reflux condenser topped with a gas exit tube was charged with 1000 ml. of diethyl ether and 1042.5 g. of phosphorus pentachloride. This suspension was stirred and cooled in an ice bath. In separate container, a solution of 425.5 g. (5.0 moles) of cyanoacetic acid in 1750 ml. of diethyl ether was dried over magnesium sulfate and filtered to remove drying agent. It was then added over a period of 3–7 minutes with good stirring to the cold suspension. (The exothermic reaction which occurs can be controlled by adjusting the rate of addition, but a rapid rate is essential for optimum yield.) The condenser was immediately replaced with a short head and condenser. Ether and phosphorus (aspirator) to afford crude cyanoacetyl chloride as an orange-red, mobile liquid. During this operation, the internal pot temperature was not allowed to exceed 55° C. This step is critical since higher temperatures will cause degradation of cyanoacetyl chloride and may induce exothermic and uncontrollable polymerization. Samples of cyanoacetyl chloride should be used directly after preparation and should not be stored.

Distillation apparatus was then removed and replaced with a reflux condenser topped with a gas exit tube. The selected fluoroalcohol was placed in the funnel and about one-third added to the crude cyanoacetyl chloride. If the reaction did not begin spontaneously as evidenced by evolution of hydrogen chloride, the mixture was heated to 55°–65° C.; the remaining fluoroalcohol was then added slowly to maintain a smooth reaction. After completion of addition, the mixture was stirred at 55°–65° C. until no more hydrogen chloride was evolved. The acidic product was transferred to a smaller flask and crudely distilled to afford fluoroalkyl cyanoacetate. Fractional redistillation provided pure fluoroalkyl cyanoacetate with yields in the range of 75–85 percent.

Example 2: 2,2,2-trifluoroethyl 2-cyanoacrylate

Six hundred milliliters of benzene, 167.1 g. (1.0 mole) of 2,2,2-trifluoroethyl cyanoacetate, 36.0 g. (1.2 moles) of powdered paraformaldehyde, 1.0 g. of piperidine hydrochloride and 0.2 ml. of glacial acetic acid were combined in a 1–1 two-necked round-bottomed flask equipped with mechanical stirrer, Dean-Stark water trap and reflux condenser. The heterogeneous mixture was stirred and heated and heated under gentle reflux until all water formed during the reaction had been azeotropically removed and collected in the Dean-Stark trap. Only a portion of the poly (trifluoroethyl cyanoacrylate) formed in the reaction separated; the remainder was precipitated by cooling the flask in an ice bath.

After the cold benzene had been decanted, 300 ml. of anhydrous acetone was added and warmed to dissolve polymer. The clear polymer solution was filtered (to remove piperidine hydrochloride and any unreacted paraformaldehyde) into a clean 1–1 two-necked, round-bottomed flask equipped with mechanical stirrer, and 100 g. of tricresyl phosphate were added to aid in fluidizing the mixture. Acetone was then removed by distillation. Pressure in the system was gradually reduced to 15–20 mm. Hg, and the bath temperature slowly raised to 110°–120° C. Last traces of acetone were eliminated by stirring the yellow, viscous mixture vigorously for 30 minutes under these conditions.

At this point, 6–10 g. of polyphosphoric acid and 0.5 g. of pyrogallol were added to serve as inhibitors, and the flask was equipped with a short take-off heat fitted with a gas inlet tube mounted in the thermometer well. Thermal depolymerization was effected by heating this mixture under reduced pressure with good stirring while sulfur dioxide was bled into the system. Collection of monomeric 2,2,2-trifluoroethyl 2-cyanoacrylate in a Dry Ice-cooled receiver was begun when the bath temperature/system pressure reached 155° C. /20 mm. and continued up to a maximum of 200° C./10 mm. Clear, colorless monomer obtained in this fashion is sufficiently pure for most adhesive applications; yield, 95 g. (53 percent based on 2,2,2-trifluoroethyl cyanoacetate).

Greater purity may be achieved by redistillation from a small amount of phosphorus pentoxide using a short Vigreux column. A sulfur dioxide bleed to serve as inhibitor and prevent anionic polymerization is essential during any such redistillation. On redistillation, the distillation cut boiling at 83°–84° C./13 mm. weighed 71 g. and was shown to be 95.8 percent pure 2,2,2-trifluoroethyl 2-cyanoacrylate.

Monomer purity was established by gas chromatography using a chromatograph equipped with a 6' x ¼" nitrile-containing silicone column packed on diatomaceous earth (of the type commercially available under the trade name "60/70 Anakrom ABS") and operated at column temperatures of 150°–190° C. Monomer samples were injected as 10 percent solutions in spectrograde nitromethane.

Example 3: 2-(2,2,2-trifluoroethoxy)ethyl 2-cyanoacrylate

Two hundred milliliters of benzene, 84.0 g. (0.40 mole) 2-(2,2,2-trifluoroethoxy)ethyl cyanoacetate, 15.6 g. (0.52 mole) powdered paraformaldehyde, 0.4 g. piperidine hydrochloride and 0.2 ml. glacial acetic acid were combined in a 500 ml. two-necked, round-bottomed flask equipped with mechanical stirrer. Dean-Stark water trap and reflux condenser. The heterogeneous mixture was stirred and heated under reflux until no additional water separated in the Dean-Stark trap. The benzene solution was cooled, filtered into a 250 ml. two-necked flask and concentrated on a rotary evaporator.

The flask was equipped for depolymerization as outlined in Example 2, and 45 g. tricresyl phosphate was added followed by 2 g. polyphosphoric acid and 0.2 g. pyrogallol. The mixture was stirred and heated under reduced pressure in the presence of sulfur dioxide. Collection of monomeric 2-(2,2,2-trifluoroethoxy)ethyl 2-cyanoacrylate in a Dry Ice-cooled receiver was begun when the bath temperature/system pressure reached 190° C./0.2 mm. and continued up to a maximum of 198° C./0.2 mm.; yield, 69.8 g. (78.6%). Redistillation gave a 49 g. sample of monomer, B.P. 98°–100° C./0.2 mm., which was found to be 99.3 percent pure by gas-liquid chromatography.

Example 4: 2-trifluoromethyl-2-propyl 2-cyanoacrylate

Two hundred milliliters of benzene, 48.8 g. (0.25 mole) of 2-trifluoromethyl-2-propyl 2-cyanoacetate, 9.0 g. (0.30 mole) of powdered paraformaldehyde, 0.5 g. of piperidine hydrochloride and 0.2 ml. of concentrated hydrochloric acid (12 N) were combined in a 500 ml. two-necked round-bottomed flask equipped with a mechanical stirrer, Dean-Stark water separator and reflux condenser. The heterogeneous mixture was stirred and heated until no additional water separated in the trap. In this case, since the low-molecular weight polymer formed in the reaction remained in solution upon cooling, the benzene solution was filtered into a 250 ml. two-necked flask and concentrated on a rotary evaporator. The flask was equipped for depolymerization as outlined in Example 2, and 25 g. of tricresyl phosphate, 5 g. of polyphosphoric acid and 0.5 g. of pyrogallol were added.

The mixture was stirred and heated under reduced pressure in the presence of sulfur dioxide. Collection of monomeric 2-trifluoromethyl-2-propyl 2-cyanoacrylate in a Dry Ice-cooled receiver was begun when the bath temperature/system pressure reached 165° C./19 mm. and continued up to a maximum of 190° C./20 mm.; yield, 21.9 g. (42.3%). Using the gas chromatographic procedure outlined in Example 2, this material was shown to be 97.3 percent pure monomer and required no further purification.

Example 5: n-octyl 2-cyanoacrylate

Two hundred fifty milliliters of benzene, 98.7 g. (0.5 mole) of n-octyl cyanoacetate, 19.5 g. (0.65 mole) of powdered paraformaldehyde, 5.0 g. of piperidine hydrochloride and 0.2 ml. of concentrated hydrochloric acid (12 N) were combined in a 500 ml. two-necked, round-bottomed flask equipped as described above. The heterogeneous mixture was stirred and heated until no additional water separated in the Dean-Stark trap. Benzene was removed with a rotary evaporator. The residue was taken up in a mixture of 200 ml. of acetone and 100 ml. of hexane and filtered into a 500 ml. two-necked flask. Removal of acetone and hexane provided a viscous residue which was sufficiently fluid to permit easy handling.

Polyphosphoric acid (6 g.) and pyrogallol (1.0 g.) were added to serve as inhibitors, and the flask was equipped for depolymerization as described in Example 2. The mixture was stirred and heated under reduced pressure in the presence of sulfur dioxide. Collection of monomeric n-octyl 2-cyanoacrylate in a Dry Ice-cooled receiver was begun when the bath temperature/system pressure reached 165° C./0.6 mm. and continued up to a maximum of 206° C./0.6 mm.; yield 57.4 g. (55%). Redistillation afforded a 42 g. sample of n-octyl 2-cyanoacrylate, B.P. 105°–106° C./0.6–0.7 mm., which was found to be 93.2 percent pure by gas-liquid chromatography.

Example 6: 2-chloroethyl 2-cyanoacrylate

Five hundred milliliters of benzene, 147.6 g. (1.0 mole) of 2-chloroethyl cyanoacetate, 39 g. (1.3 moles) of powdered paraformaldehyde, 1.0 g. of piperidine hydrochloride and 0.2 ml. of glacial acetic acid were combined in a 1–1, two-necked, round-bottomed flask equipped as described above. The heterogeneous mixture was stirred and heated until no additional water separated in the Dean-Stark trap. Benzene was removed with a rotary evaporator. The residue was taken up in 300 ml. of warm, anhydrous acetone and filtered into a 1–1 two-necked flesk. After 75 g. of tricresyl phosphate had been added, acetone was removed as dscribed in Example 2.

At this pont 5 g. of polyphosphoric acid and 0.5 g. of pyrogallol were addedd to serve as inhibitors, and the flask was equipped for depolymerization. The mixture was stirred and heated under reduced pressure in the presence of sulfur dioxide. Collection of monomeric 2-chloroethyl 2-cyanoacrylate was begun when the bath temperature/system pressure reached 150° C./0.15 mm. and continued up to 170° C./0.15 mm. Crude, colorless monomer obtained in this fashion weighed 99.1 g. (67%) and requird no further purification before use; it was found to be 97.9 percent pure by gas-liquid chromatography.

Examples of other 2-cyanoacrylate esters which have been prepared by use of the present invention are collected in the following table, wherein relative amounts and reaction procedures are substantially similar to those described in Example 2.

TABLE I.—PREPARATION OF 2-CYANOACRYLATE ESTERS $$CH_2=C\begin{smallmatrix}CN\\CO_2R\end{smallmatrix}$$

| R | Reaction scale (moles of cyano-acetate) | Condensation catalyst | Yield, percent |
|---|---|---|---|
| —$CH_3$ | 0.5 | 1.0 g. piperidine hydrochloride, 0.1 ml. conc. hydrochloric acid. | 63 |
| —$CH_2CH_3$ | 0.25 | 2.0 g. dimethylamine hydrochloride, 0.5 ml. conc. hydrochloric acid. | 39 |
| —$CH_2CH(CH_3)_2$ | 0.5 | 5.0 g. piperidine hydrochloride, 0.2 ml. conc. hydrochloric acid. | 47 |
| —$CH_2CF_2CF_3$ | 0.415 | 0.5 g. piperidine hydrochloride, 0.2 ml. conc. hydrochloric acid. | 44 |
| —$CH_2CF_2CF_2H$ | 0.22 | ___do___ | 34 |
| —$CH(CH_3)CF_3$ | 0.5 | 0.5 g. piperidine hydrochloride 0.2 ml. glacial acetic acid. | 43 |
| —$CH_2(CF_2)_6H$ | 0.5 | ___do___ | 19 |

In the following 16.7 g. (0.1 mole) of trifluoroethyl cyanoacetate is condensed with 3.3 g. (0.11 mole) of paraformaldehyde in the presence of 0.2 g. of amine salt and 3 drops of the acid by removal of water in refluxing benzene for about 18–19 hours. Reaction mixtures were analyzed without acid depolymerization. The method of analysis (vapor phase chromatography) results in depolymerization.

TABLE II.—PREPARATION OF TRIFLUOROETHYL CYANOACRYLATE

| Catalyst mixture | Yield |
|---|---|
| Piperidine hydrochloride, glacial acetic acid | 94 |
| Morpholine hydrochloride, glacial acetic acid | 96.4 |
| Bis(2-chloroethyl)amine, hydrochloride glacial acetic acid | 85.4 |
| Monomethylaniline hydrochloride, glacial acetic acid | 65.4 |
| Benzylamine hydrochloride, glacial acetic acid | 50 |
| Piperidine hydrochloride, hydrochloric acid | 96.2 |
| Isopropylamine hydrochloride, glacial acetic acid | 67.6 |

When the other 2-cyanoacetate esters as described hereinabove are reacted in similar reactions, for example, using piperidine hydrochloride and hydrochloric acid as catalyst, excellent conversions to the polymeric 2-cyanoacrylate are realized and the polymers are then cleaved to monomer under acidic conditions. Other acid catalyst mixtures are also satisfactory as herein described.

What is claimed is:

1. In a process for the preparation of esters of monomeric 2-cyanoacrylic acid the step of condensing formaldehyde under conditions for removal of water with an ester of cyanoacetic acid of the formula NC—$CH_2$—$CO_2R$ wherein R is a member of the group of allyl, cyclohexyl, phenyl, benzyl, or —$CHR_1R_2$ containing 1 to 8 carbon atoms, and $R_1$ and $R_2$ are independently H, alkyl, perfluoroalkyl or monohydroperfluoroalkyl of 2 to 7 carbon atoms, chloro- or fluoroalkyl of 1 to 4 carbon atoms and 1 to 3 chlorine or fluorine atoms or unsubstituted or chlorinated or fluorinated oxa- or thiaalkylene of 3 to 7 carbon atoms containing not more than two chlorine or three fluorine atoms, said condensation being carried out to substantially complete removal of water in an inert solvent codistilling with water at atmospheric pressures at a temperature from about 60° to 160° C. continuously having present as acid catalyst the combination of (I) first acid having a dissociation constant of at least $1\times10^{-5}$ and (II) salt of a primary or secondary aliphatic or cycloaliphatic or secondary aromatic or heterocyclic amine with an acid of the same or greater strength, said amine having pKa above 4 and said first acid being present to the extent of about 4 to 25 percent of the amount of said combination, such that a pH of 5 or less is obtained when said combination in an amount containing 1 g. of said salt of amine is dissolved in 50 ml. of water or water-ethanol mixture; said combination being employed in a proportion of about 0.5 to 1 percent by wegiht of the amount of cyanoacetic ester.

2. The process step according to claim 1 wherein the cyanoacetate ester is 2,2,2-trifluoroethyl cyanoacetate.

3. The process step according to claim 1 wherein the cyanoacetate ester is 1,1-dihydroperfluoropropyl cyanoacetate.

4. The process step according to claim 1 wherein the cyanoacetate ester is 2,2,3,3-tetrafluoropropyl cyanoacetate.

5. The process step according to claim 1 wherein the salt of amine is piperidine hydrochloride.

6. The process step according to claim 1 wherein the salt of amine is dimethylamine hydrochloride.

References Cited

UNITED STATES PATENTS 2,912,454 11/1959 McKeever _____ 260—465.4
2,926,188 2/1960 McKeever et al. ____ 260—465.4
3,465,027 9/1969 Hawkins _____ 260—464

JOSEPH PAUL BRUST, Primary Examiner

U.S. Cl. X.R.

260—464, 465

UNITED STATES PATENT OFFICE
CERTIFICATE OF CORRECTION

Patent No. 3,654,340          Dated April 4, 1972

Inventor(s)   Elden H. Banitt

It is certified that error appears in the above-identified patent and that said Letters Patent are hereby corrected as shown below:

Column 2, line 4, before "aromatic" insert

--aliphatic or cycloaliphatic--.

Column 4, line 66, after "phosphorus insert

--oxychloride were then distilled off under reduced pressure--.

Column 8, line 51, correct "wegiht" to read --weight---.

Signed and sealed this 28th day of November 1972.

(SEAL)
Attest:

EDWARD M. FLETCHER, JR.          ROBERT GOTTSCHALK
Attesting Officer                     Commissioner of Patents